Figures 6, 7:
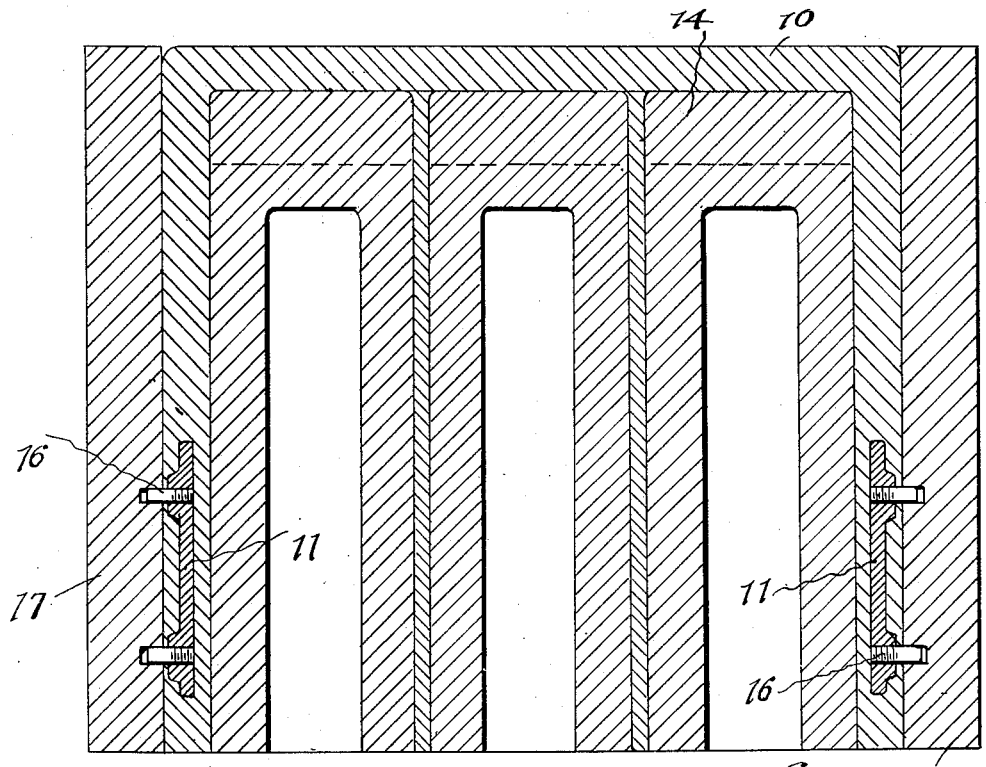

March 10, 1925. 1,529,044
T. A. WILLARD
HANDLE FOR STORAGE BATTERY CONTAINERS
Filed April 3, 1922 2 Sheets-Sheet 1
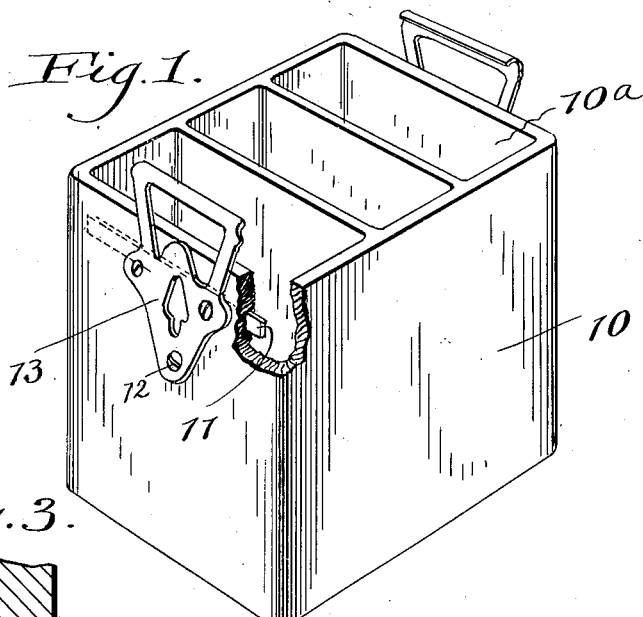
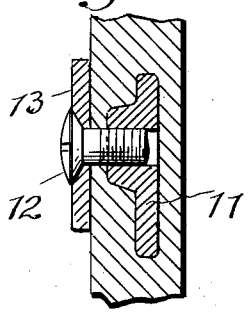
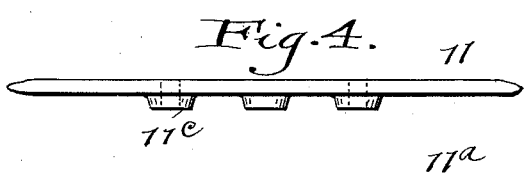
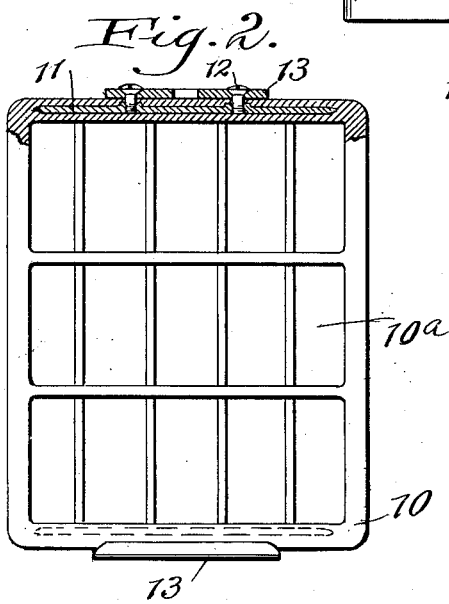
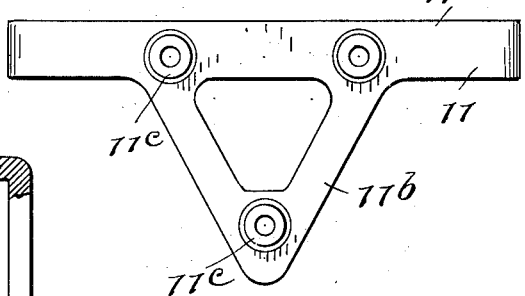
Inventor.
Theodore A Willard
by
Thurston Kwis & Hudson
attys March 10, 1925.

T. A. WILLARD

HANDLE FOR STORAGE BATTERY CONTAINERS

Filed April 3, 1922      2 Sheets-Sheet 2

1,529,044

Inventor
Theodore A. Willard
by
Thurston King & Hudson
attys

Patented Mar. 10, 1925.

1,529,044

UNITED STATES PATENT OFFICE.

THEODORE A. WILLARD, OF CLEVELAND HEIGHTS, OHIO, ASSIGNOR TO WILLARD STORAGE BATTERY COMPANY, OF CLEVELAND, OHIO, A CORPORATION OF WEST VIRGINIA.

HANDLE FOR STORAGE-BATTERY CONTAINERS.

Application filed April 3, 1922. Serial No. 549,296.

*To all whom it may concern:*

Be it known that I, THEODORE A. WILLARD, a citizen of the United States, residing at Cleveland Heights, in the county of Cuyahoga and State of Ohio, have invented a certain new and useful Improvement in Handles for Storage-Battery Containers, of which the following is a full, clear, and exact description.

This invention relates to storage battery containers and particularly multi-compartment containers formed of hard rubber, each compartment adapted to constitute an individual container for one cell of the battery.

More particularly the invention relates to a handle insert which is embedded in the end wall of the container, and the object is to provide handle inserts which are wholly embedded in the rubber, and to which handles located on the outside of the end walls may be secured, the inserts at the same time being constructed and arranged to serve as stiffening members to overcome the natural tendency for the end walls to bow outwardly near the top of the container.

In a prior application, Serial No. 473,500, filed May 28, 1921, I pointed out that the end walls of a container of the type referred to herein, are liable to and frequently do bulge outwardly near the top, notwithstanding the fact that the end walls are formed of a thick sheet of rubber, the effect of this outward bulging being to break the sealing compound connecting the upper part of the compartment walls to the cell cover. This outward bulging was effectively overcome by me by embedding in the end walls stiffening rods extending through the end walls from substantially one side of the container to the other and near to the top of the container. In this same application the container is shown as provided with handles whose ends are directly embedded in the end walls and which may be inserted in the walls of the container during the course of its manufacture, and in the manner explained in a second prior application filed by me, Serial No. 444,249, filed February 11, 1921.

In accordance with the present invention the members are embedded in the end walls of the container, and these members have the double function of forming anchorages to which the removable handles may be secured, and also of strengthening the end walls in the manner contemplated by the stiffening rods of my prior application first referred to.

Figure 8:
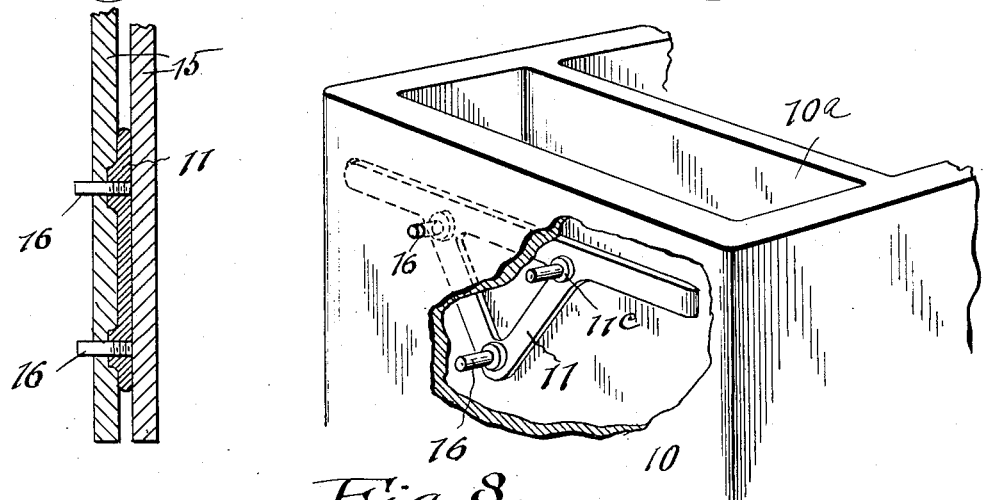

In the accompanying sheets of drawings showing the preferred embodiment of the invention, Fig. 1 is a perspective view of a multi-compartment hard rubber container embodying my invention, one corner of the container being broken away; Fig. 2 is a top plan view of the same with a part in section; Fig. 3 is an enlarged detail view to illustrate the manner in which the handle is fastened to the insert, this section showing only a portion of the end wall, and showing the bottom boss of the insert and bottom portion of the handle; Fig. 4 is an edge view and Fig. 5 is a side elevation of the insert; Fig. 6 is a sectional view showing one step in the preferred process of producing the container with the combined handle inserts and stiffening members formed in accordance with my invention; Fig. 7 is a detail view illustrating the manner in which the inserts are placed between two sheets of rubber which form the end wall of the container; and Fig. 8 is a perspective view of one corner of the container with a part broken away and before the external handle is fastened to the insert.

Referring now to the drawings, 10 represents a hard rubber multi-compartment container having transverse partitions forming a number of compartments $10^a$. In accordance with the present invention, I embed in the end walls, in the process of making the container, combined handle inserts and stiffening members such as shown in Figs. 4 and 5, and designated 11. These inserts are preferably provided with a top cross bar $11^a$, and in this instance it is provided also with a V-shaped extension $11^b$. The cross bar is provided with two bosses $11^c$, and at the bottom of the V there is a third boss, which bosses extend toward the outer surface of the end wall as shown in Fig. 3. These bosses are threaded, and receive fastening screws 12 by which the handles 13 are secured to the ends of the container.

Obviously if the handles 11 become corroded, they can be replaced with new handles, this being an advantage over any construction wherein the handles are embedded directly in the container walls.

In making this container the inserts 11 are wholly embedded in the walls, with the top cross bar 11<sup>a</sup> extending through the walls parallel to the inner and outer surfaces thereof, and near the top of the container, as clearly shown in the drawings, so that it may serve to stiffen the end walls and prevent the outward bowing which would otherwise take place near the top of the container. As will be observed in Fig. 2, the top bar of the insert extends through the end wall substantially to the side edges of the latter, or substantially to the points where the end wall joins the side walls. Furthermore, in inserting the inserts in the rubber forming the end walls, the V-shaped portions 11<sup>b</sup> of course project toward the bottom of the container, and the bosses project toward the outer surfaces of the end walls so that when the container is completed the outer faces of the bosses are fairly close to the outer faces of the end walls as best shown in Fig. 3. The inserts 11 may be of brass, cast iron, malleable iron, or other suitable material which has the necessary rigidity or stiffness and which will form secure anchorages for the handle fastening screws.

Preferably the containers are made substantially in the manner illustrated in my prior application, Serial No. 444,249, in which event rubber in sheet form is placed around the sides or vertical faces of a series of cores to form the side and end walls of the container; also over the ends of the cores to form the bottom of the container, and also between the containers to form the partitions, and after the core and rubber assembly has been made, the whole is compressed between the plungers of a press to cause the various sheets of rubber to firmly adhere together, after which the uncured container is vulcanized.

In Fig. 6 of this application I have shown a series of the cores at 14, the container 10 being shown after the compressing step.

When the inserts are to be provided in the end walls as described above, each end wall is formed from two sheets of rubber which I have indicated at 15 in Fig. 7, substantially as described in my said prior application Serial No. 473,500, but after the compression step the two sheets are united into one continuous sheet or wall in the manner indicated in Fig. 6, the rubber having then been squeezed around the insert as illustrated.

In forming this container with the embedded inserts it is important that the inserts be prevented from "floating" or being displaced from the positions in which they belong during the compressing step, and it is important also that the screw holes formed in the bosses of the insert be not filled with rubber. Both of these results are accomplished very effectively by proceeding in the following manner. When the inserts are placed on the inside sheet 15, i. e. on the inner sheet forming the end wall they are provided with pins 16 screwed into the bosses and projecting outwardly; then the second and outer sheet is placed over the first and over the insert, and this sheet is provided with properly located punched holes which are fitted over the pins as illustrated in Fig. 7, the length of the pins being such that they project outwardly somewhat beyond the outer sheet so that they may be utilized for centering purposes in the compression step. In order that this may be accomplished, the compressing plates which are indicated at 17 in Fig. 6 which engage the end walls are provided with properly located openings which receive the ends of the pins as indicated in Fig. 6 so as to definitely and positively hold the inserts in place and prevent the floating referred to, when the assembly is powerfully compressed in the press. These plates 17 are preferably separate from the compressing plungers and may be placed up against the ends of the partially formed containers so as to receive the projecting ends of the pins prior to the compressing operation. On the other hand, the openings which receive the pins may be formed directly in the faces of the opposing plungers and the plates 17 dispensed with.

After the compressing operation the pins 16 are removed from the uncured but compressed container, and when the container is vulcanized the handles 13 can be attached by the screws 12, there being openings in the rubber leading to the threaded openings of the bosses of the inserts due to the use of the pins 16.

It is not necessary that the pins 16 be removed prior to vulcanization, but they can be more easily removed prior to than after vulcanization.

By forming the container in the manner above explained, the inserts are positioned where they belong to act as stiffening members and to receive the handles, and the handles can be quickly and securely attached to the inserts.

Having described my invention, I claim:

1. A storage battery container formed of plastic material and having handle inserts wholly embedded in the walls thereof, and external handles secured to the inserts.

2. A storage battery container formed of plastic material and having handle inserts embedded in the walls thereof, said inserts having portions extending substantially the width of said walls so as to stiffen the same and prevent the outward bowing.

3. A hard rubber storage battery container having handle inserts embedded in the end walls thereof, said inserts having portions extending substantially the width of said walls near the top thereof.

4. A hard rubber storage battery container having handle inserts embedded in the end walls thereof, said inserts having portions extending substantially the width of said walls near the top thereof, said inserts having threaded openings and handles fastened to said inserts by screws extending into the openings.

In testimony whereof, I hereunto affix my signature.

THEODORE A. WILLARD.